United States Patent [19]

Hammond

[11] Patent Number: 5,260,725
[45] Date of Patent: Nov. 9, 1993

[54] METHOD AND APPARATUS FOR REGISTRATION OF SEQUENTIAL IMAGES IN A SINGLE PASS, COLOR XEROGRAPHIC PRINTER

[75] Inventor: Thomas J. Hammond, Penfield, N.Y.
[73] Assignee: Xerox Corporation, Stamford, Conn.
[21] Appl. No.: 946,703
[22] Filed: Sep. 18, 1992
[51] Int. Cl.$^5$ .................. G03G 15/01; G03G 21/00
[52] U.S. Cl. .................. 346/157; 355/317
[58] Field of Search ............... 346/157; 355/317

[56] References Cited

U.S. PATENT DOCUMENTS

| | | |
|---|---|---|
| 4,569,584 | 2/1986 | St. John et al. ............... 346/157 X |
| 4,611,901 | 9/1986 | Kohyama et al. ............... 355/4 |
| 4,660,059 | 4/1987 | O'Brien ............... 346/157 |
| 4,833,503 | 5/1989 | Snelling ............... 355/259 |
| 4,965,597 | 10/1990 | Ohigashi et al. ............... 346/157 |
| 5,025,269 | 6/1991 | Saeki et al. ............... 346/157 X |
| 5,040,003 | 8/1991 | Willis ............... 346/157 |
| 5,160,946 | 11/1992 | Hwang ............... 346/157 |

Primary Examiner—George H. Miller, Jr.

[57] ABSTRACT

A single pass, hybrid ROS/print bar system provides a plurality of latent images which may subsequently be developed in different colors. A ROS unit is initially aligned so that each scan line is registered in the process direction. The alignment is accomplished by forming a pair of opposed V-shaped apertures in the surface of the belt and detecting scan line cross-over of the legs of the V. These cross-overs are manifested as two sets of pulses generated by sensors associated with each target leg. The time differences between pulse sets are compared and the scan line is rotated until the time differences are equal. Once the ROS is registered for skew, one or more print bars are registered by enabling non-image pixels and comparing the output generated by detectors when the lit pixels are viewed through the V-shaped aperture.

4 Claims, 4 Drawing Sheets

METHOD AND APPARATUS FOR REGISTRATION OF SEQUENTIAL IMAGES IN A SINGLE PASS, COLOR XEROGRAPHIC PRINTER

BACKGROUND OF THE INVENTION AND MATERIAL DISCLOSURE STATEMENT

The present invention relates to registration of plural image exposures formed on a photoreceptor belt in a single pass by a plurality of imagers and, more particularly, to improvements in registration by sensing registration marks associated with each image exposure.

Printers are known in the art wherein an imager, such as a Raster Output Scanner (ROS) or a linear LED print bar, is positioned in an optical scan system so as to write an image on the surface of a moving photoreceptor belt. In a ROS system, a modulated laser beam is swept across the photoreceptor surface after being directed against the facets of a rotating polygon. Each sweep exposes a raster line to a linear segment of a video signal image. The LED print bar generally consists of a plurality of light emitting diodes or pixels arranged in a linear array on a common substrate. Each LED in the linear array is used to expose a corresponding area on a moving photoreceptor to an exposure value, defined by the video data information applied to the drive circuits of the print bars. With use of either imager, the photoreceptor is advanced in the process direction to provide a desired image frame by the formation of sequential scan lines.

In a color xerographic printer, a plurality of imagers, either all LED print bars or all ROSs or a combination thereof, are positioned adjacent a photoreceptor belt surface and selectively energized to create successive image exposure until a series of image frames, each of a separate color image, is formed. If two imagers are used, the system typically provides one highlight color and one black color. For full color, four imagers are used, one for each of the three basic colors and a fourth print bar for black images.

Each color image must be registered in both the photoreceptor process direction (pitch and skew registration) and in the direction perpendicular to the process direction (referred to as the fast scan or transverse direction).

There are several prior art techniques for registering LED print bars in the lateral direction. Co-pending application U.S. Ser. No. 07/807,931, assigned to the same assignee as the present invention, discloses LED print bar registration techniques which utilize belt holes and associated sensors to generate registration correction signals which are used to drive stepper motors which provide transverse and rotational motion to an associated image bar. Another co-pending application U.S. Ser. No. 07/635,835, assigned to the same assignee as the present invention, discloses lateral registration techniques which include physical shifting of the print bar by operation of piezoelectric stacks. A still further co-pending application, U.S. Ser. No. 07/862,150, assigned to the same assignee as the present invention, discloses lateral registration of print bars by use of pairs of oppositely aligned holes formed on the photoreceptor, beneath which are placed sensors which detect light from selected print bar pixels. Another co-pending application, U.S. Ser. No. 07/807,927, assigned to the same assignee as the present invention, discloses process direction (skew) registration techniques related to those of the '150 application but directed to ROS imagers. The contents of these four applications are hereby incorporated by reference.

For some systems, it may be desirable to use a combination of imagers; e.g. a ROS imager is used to form at least one of the image frames and LED print bars are used to form the remaining frames. One reason for implementing this hybrid imaging system is the more compact nature of the imaging space enabled by using print bars which occupy less space than the counterpart ROS unit. The compact nature of the LED imager enables upgrade of existing products with the addition of highlight color. The above listed disclosures, while providing registration for an all ROS or an all print bar imaging system, do not provide for registration of a hybrid system.

The present invention is, therefore, directed towards a method and apparatus for registering a plurality of images in a process direction in a hybrid ROS/LED print bar imaging system. The method and apparatus, however, may also find utility in registering an all ROS imaging system. The method and apparatus, however, may also find utility in registering an all ROS imaging system. More particularly, the present invention is directed towards an apparatus for registration of multiple image exposure frames on a photoreceptor belt, moving in a process direction, during a single rotation of the photoreceptor including:

a photoreceptor belt adapted to accommodate the formation of an integral number of image exposure frames, said belt having first and second registration targets on opposite sides of the belt width in non-image areas, each target comprising a transparent V-shaped target with the apex of each V aligned along a common line parallel to the process direction, at least one Raster Output Scanner (ROS) unit associated with the formation of one of said image exposure frames, said ROS unit forming a plurality of projected scan lines in a fast scan (transverse) direction across the belt width, said scan lines beginning and ending at points outside of the image exposure frame and crossing over said registration targets, when said targets move therepast, detecting means associated with each of said targets, said detecting means detecting the light passing through said targets from said ROS as said belt carries said targets past said ROS, control means for comparing output signals generated by said detecting means to establish whether coincidence exists between signals generated by each pair of associated detectors, and means for skewing the projected scan lines formed by said ROS until said detected signals are coincident.

DETAILED DESCRIPTION OF THE INVENTION

Figure 1:
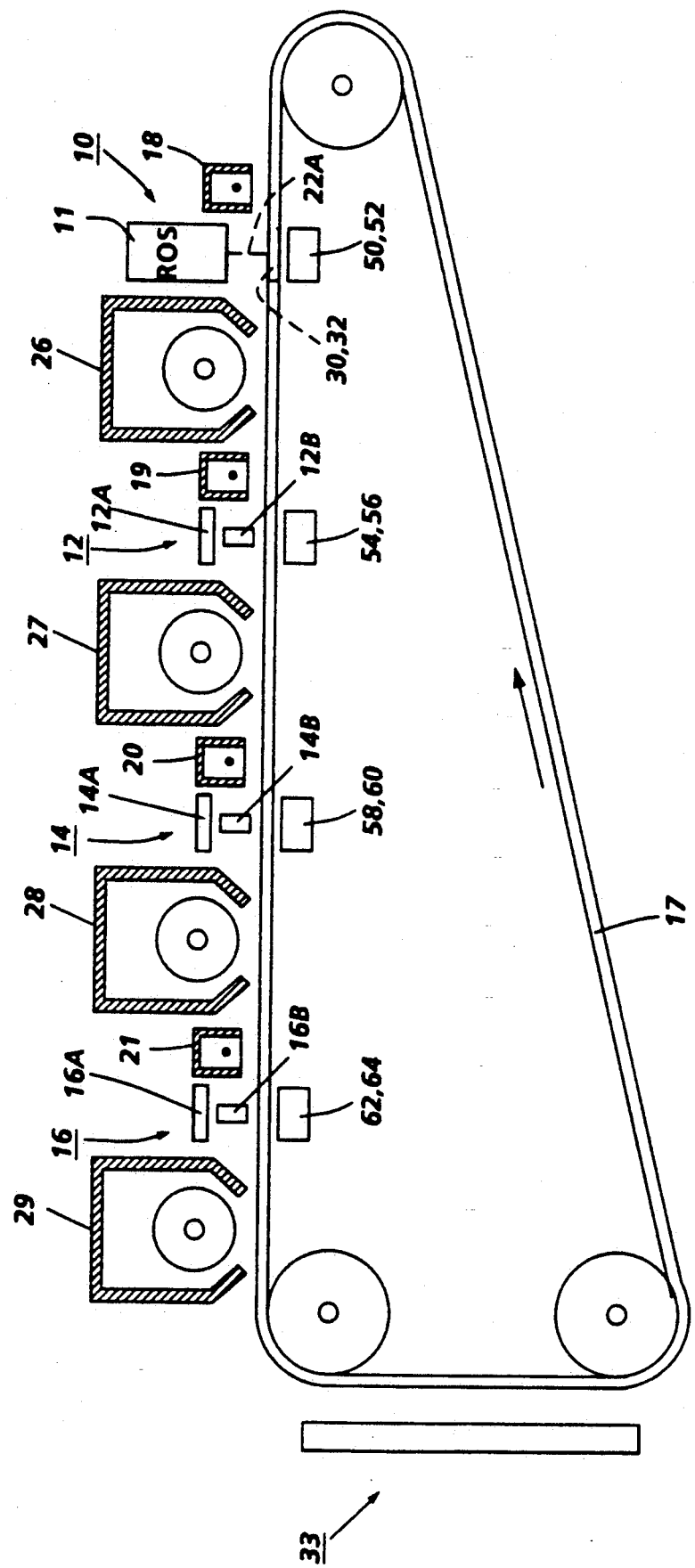
FIG. 1 is a side view of a single pass ROS/LED hybrid printer.
Figure 2:
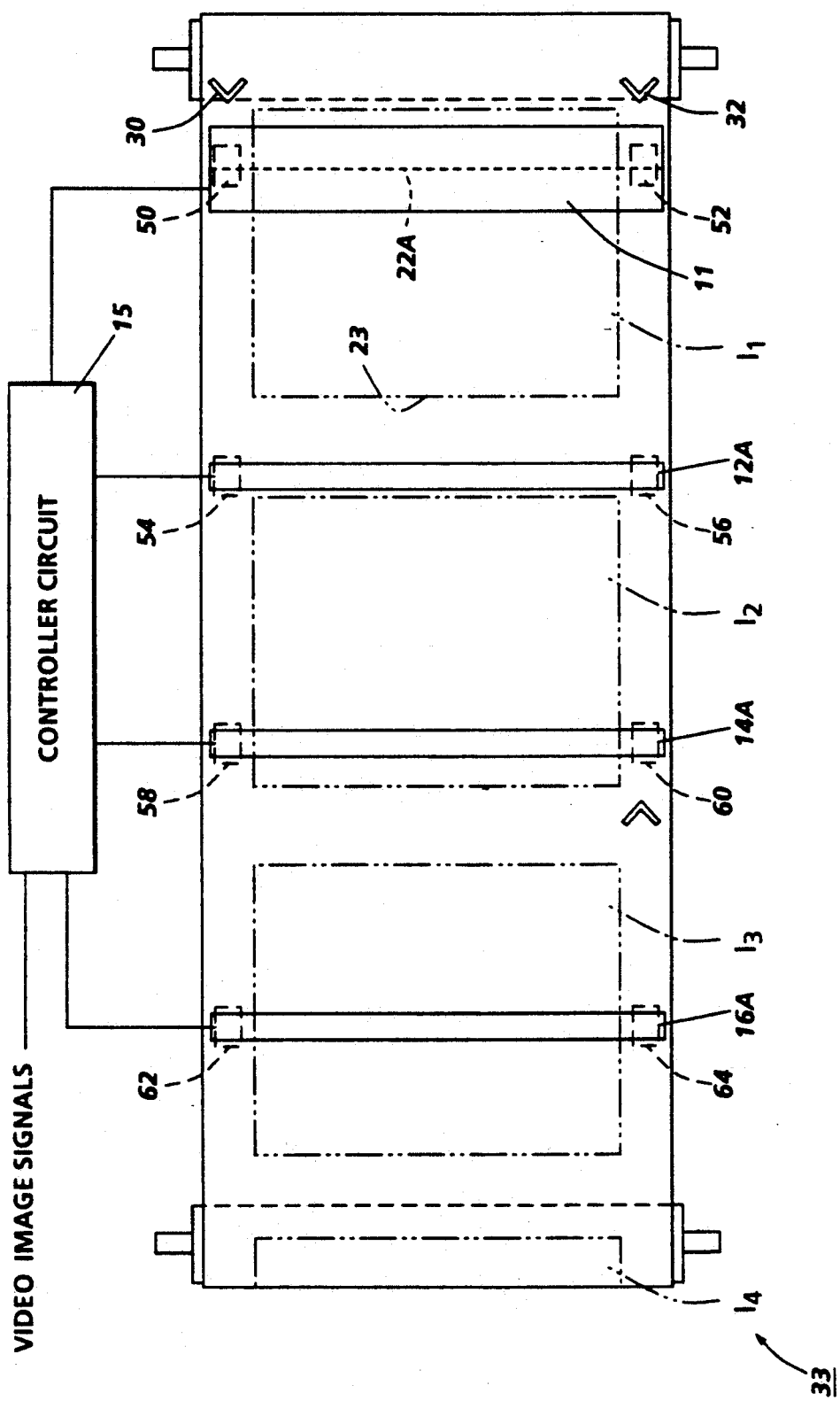
FIG. 2 is a top view of the printer of FIG. 1 omitting the xerographic stations.

FIG. 1 shows a side view of the single pass, color printing system of the present invention having four exposure stations 10, 12, 14, 16. In a preferred embodiment, station 10 incorporates a ROS unit 11, while stations 12, 14 and 16 include LED print bars 12A, 14A, 16A, and linear gradient index lens arrays 12B, 14B, 16B, respectively. FIG. 2 shows a top view of the system of FIG. 1, absent the xerographic stations for ease of description. ROS unit 11 and each print bar is selectively addressed by video image signals processed through controller circuit 15, to produce modulated output beams which are scanned as a series of scan lines onto the surface of previously charged photoreceptor belt 17. The length of belt 17 is designed to accept an integral number of full page image areas, four of which are shown; $l_1$–$l_4$. Upstream of each exposure station are charge devices 18, 19, 20, 21, which place a predetermined electrical charge on the surface of belt 17. As the belt moves in the indicated direction, an image frame is exposed, in succession, by each imager, with each imager laying down the color exposure corresponding to the input video data. The first line of each image frame, represented by line 23 in frame $l_1$, is written in response to a line sync signal which is generated by detection of a target or hole in the belt, using the techniques described in, for example, the aforementioned applications. Each exposure frame is formed of a plurality of closely spaced, transverse scan lines laid down by either the ROS or the LED bars. Downstream from each exposure station, a development system 26, 27, 28, 29, develops a latent image of the previous exposure without disturbing previously developed images. The developed image is then recharged and re-exposed by the next imager. A fully developed color image is then transferred at transfer station 33 to an output sheet. Further details of xerographic stations in a multiple exposure single pass system are disclosed in U.S. Pat. Nos. 4,660,059, 4,611,901 and 4,833,503, whose contents are hereby incorporated by reference.

With such a system as that disclosed in FIGS. 1 and 2, each color image $l_1$–$l_4$ must be precisely aligned (registered) so that all the scan lines in each of the image frames are in registration. Current requirements call for registration tolerances of approximately 125$\mu$. The print bar alignment requirements are for 25$\mu$, the pixels of each bar to be aligned in the lateral or Y-direction of FIG. 2, as well as the 25$\mu$ for process or X-direction. This alignment must be maintained within this tolerance range through continuous revolutions (passes) of the photoreceptor. Also, the accuracy of the pixel output formed at the photoreceptor is a function of the accuracy of the pixel placement on the print bar and the focusing tolerance of the associated lens array.

One of the main causes of skew error is due to belt conicity in the photoreceptor belt. Belt conicity is created when the two ends of the photoreceptor sheet are welded together to form the belt, causing the two belt edges to be of slightly different lengths. Another factor is the "set" that the belt takes over the life of the belt due to lateral deviation in tension roll or steering roll forces. A third source of potential belt conicity is the machine warm-up difference in temperature gradients from machine front-to-back causing lateral distortion. A still further potential source of conicity is movement of the photoreceptor module during, for example, a jam clearance. Any of these might create a situation, referring to FIG. 2, wherein the leading edges of images $l_1$, $l_2$, $l_3$, $l_4$ would rotate as they translate from one position to the next. If images $l_2$, $l_3$, $l_4$ are to be perfectly registered with image $l_1$, the leading edges must not be parallel to each other but must accommodate the rotation induced by the conicity of the belt. Since the degree and direction of the conicity of the belt varies from belt to belt, each ROS system must be individually aligned to correct for the initial misregistration.

Continuing with the description of the system shown in FIGS. 1 and 2, two V-shaped, transparent registration targets 30, 32 are formed at opposite sides of the belt width. The targets are aligned so that a line through the apex is parallel to the process direction of photoreceptor motion. Fixed in place at the start-of-scan for the image frame associated with ROS 11 and beneath each of the print bars are registration sensor pairs 50, 52; 54, 56; 58, 60; 62, 64. Thus, ROS 11 has associated sensors 50, 52, print bar 12A has sensors 54, 56, print bar 14A, sensors 58, 60, and print bar 16A, sensors 62, 64. The sensors are used to detect the passage of targets 30, 32, as described below. Signals generated by each sensor are used to provide signals which will be used to enable skew registration of all imagers. It is assumed that both the ROS and LED print bars have been initially aligned to correct any transverse (lateral) registration errors by techniques disclosed in the aforementioned applications.

Examining first the operation of exposure station 10 and referring to FIG. 2, ROS unit 11 uses a conventional laser light source and polygon scanning techniques to form scan lines 22A, one of which is shown. The scan line may be an unmodulated light beam which erases the charge between image frames, or it may be a modulated beam which writes a line of image information. A plurality of successive image scan lines forms the exposure frame $l_1$. This first image frame representing a first color moves past exposure stations 12, 14, 16, print bars 12A, 14A, 16A, respectively. Each print bar comprises a linear array of pixels which emit radiation when addressed, to form images at some predetermined resolution focused by the associated lens array at the photoreceptor. As shown in FIG. 2, each print bar includes an image forming segment which overlies the image areas and segments located on both ends of the bar which lie outside the image areas. It is noted that the ROS unit 11 forms scan lines 22 which will cross the V-shaped sensor pairs, and that the end segments of each print bar will overlie the V-shaped targets as the target is periodically moved therepast. The scan line for the ROS will be laid down coincidentally by use of a start of scan and an end of scan sensor (not shown), by conventional in the art.

Figure 3:
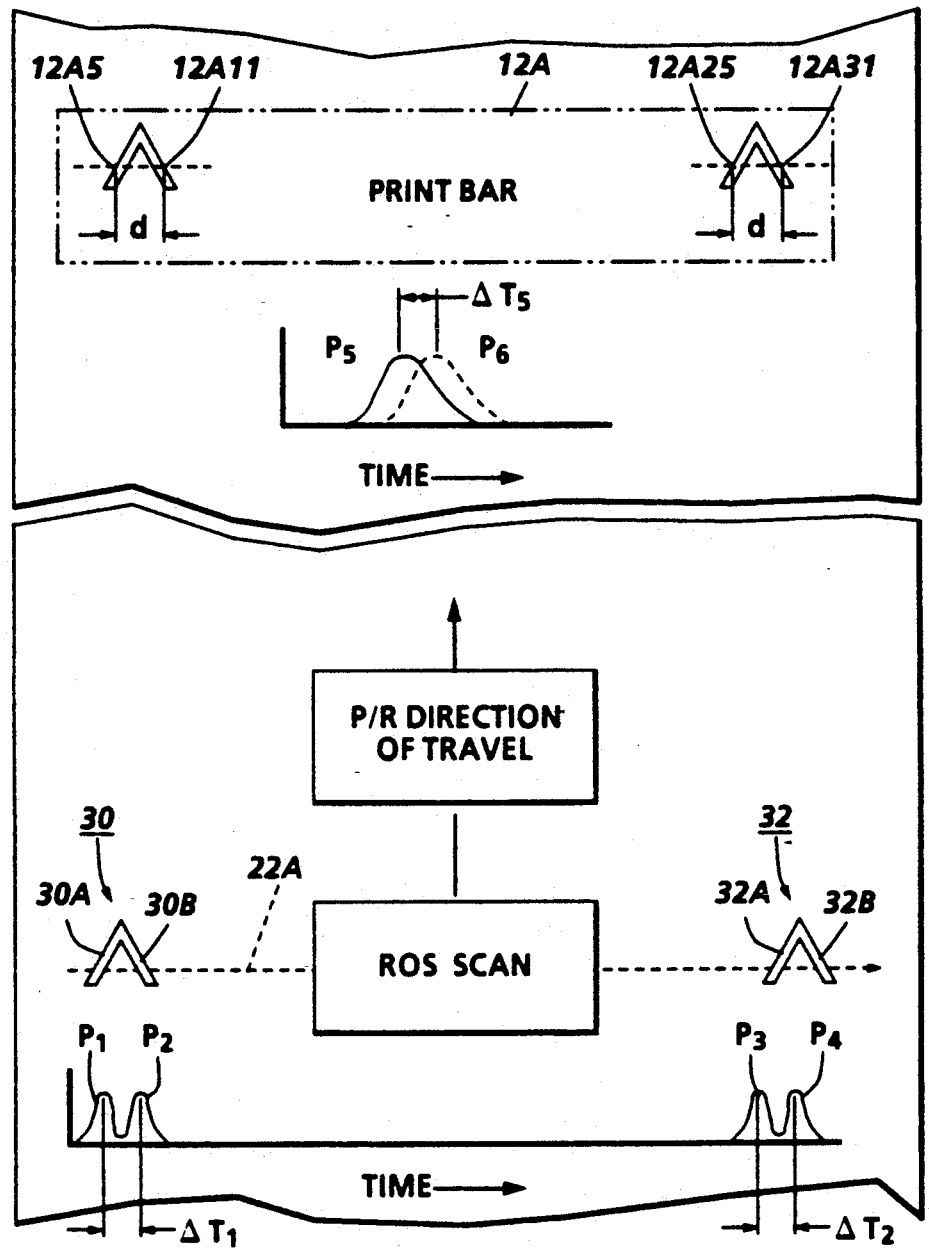
FIG. 3 is an enlarged view of the photoreceptor belt showing a ROS and print bar location.

According to the present invention, skew registration between the ROS image station and the print bar registration stations is initially set and maintained by a procedure which first sets the registration of the ROS unit and then uses timing information derived from this initial registration to register the downstream print bars. Referring now to FIGS. 2 and 3, a scan line 22A formed by ROS unit 11 is swept across the photoreceptor surface. Photoreceptor belt 17 is moved in the process direction, bringing target pair 30, 32 into and across the scan line. As the beam crosses each target 30, 32, light passes through transparent arm segments 30A, 30B, 32A, 32B, as shown in FIG. 3. The light is transmitted through the segments, producing two sets of light pulses. The pair of pulses produced by transmission through segment 30A, 30B is shown as pulses $P_1$, $P_2$, separated by a time interval $\Delta T_1$. The pair of pulses produced by transmission through segment 32A, 32B is shown as pulses $P_3$, $P_4$, separated by a time interval $\Delta T_2$. Since the targets 30, 32 are located directly across from one another on the photoreceptor, the differences in time between two sets of pulses ($\Delta T = \Delta T_1 - \Delta T_2$) can be used to determine if the scan line formed by the ROS unit 11 is skewed with respect to the process direction.

If the beam is skewed, for example, if the left hand side is shifted toward the apex of the timing mark, the first set of pulses ($\Delta T_1$) will have a shorter time difference between pulses than the second set ($\Delta T_2$). If the skew is toward the open end of the timing mark, the difference will be longer in the first set of pulses than the outboard set. The sign (− or +) and value of $\Delta T$ can be used to control and adjust the ROS beam skew.

Figure 4:
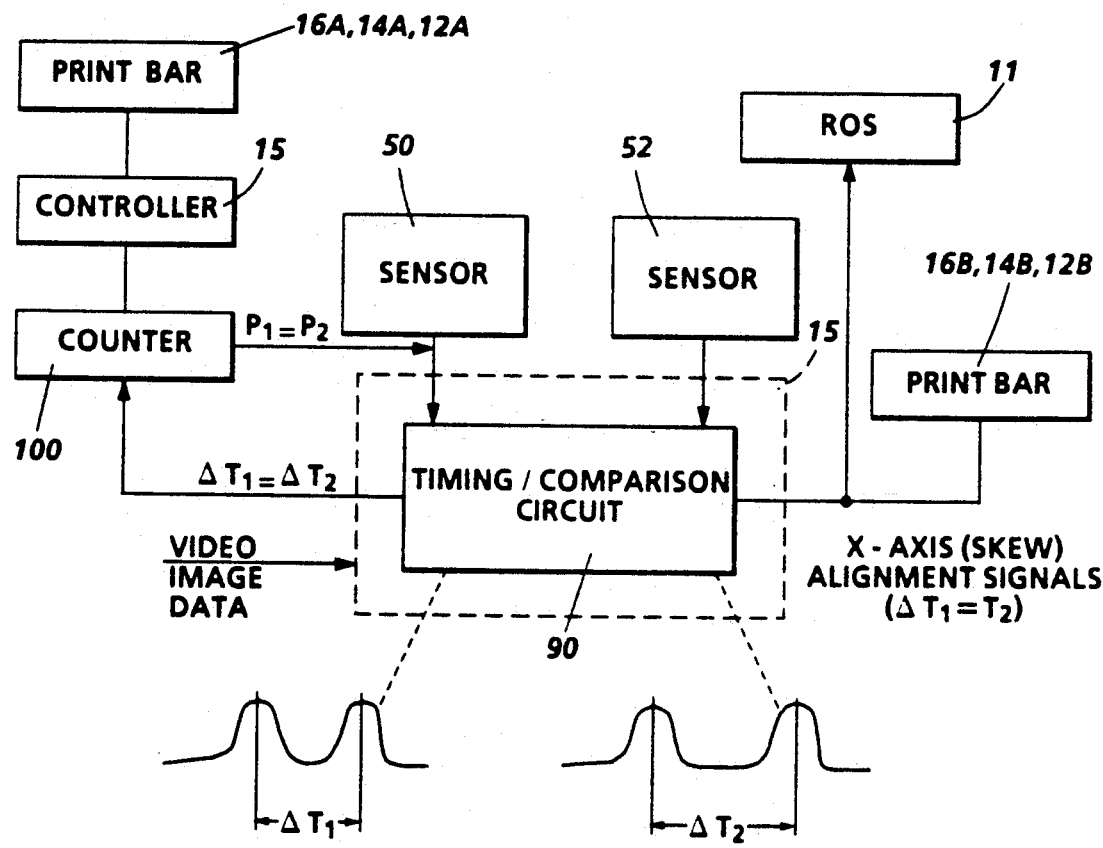
FIG. 4 is a block diagram of the control circuitry for enabling the skew registration.

A skew condition will be detected in a timing/comparision circuit 90 (FIG. 4), a part of control circuit 15. Circuit 90 receives the input signals from sensors 50, 52, compares $\Delta T_1$ to $\Delta T_2$, and if they are not equal, generates an error signal which is sent to ROS unit 11, which contains the control circuitry which repositions one of the optical components in the ROS unit, to rotate the scan line 22A in a direction determined by the sensed difference; e.g. is $\Delta T_1$ larger than $\Delta T_2$, or vice versa. The ends of the compensated scan line are again transmitted through targets 30, 32, following a belt revolution and additional corrections are made if necessary until $\Delta T_1$ equals $\Delta T_2$ (no error signal is generated by circuit 90). This establishes a correct process registration for ROS unit 11.

With the establishment of the registration of ROS 11, the print bars can now be sequentially registered in the following manner. From this time difference ($\Delta T_1 = \Delta T_2$) between pulses $P_1$, $P_2$, and $P_3$, $P_4$, and the ROS beam velocity, the distance d between the cross over points of the ROS beam on the legs 42A, 42B of the registration mark 30, can be determined. The time difference $\Delta T$ between these pulses is converted into a voltage representing the linear distance between pulses $P_1$, $P_2$, $P_3$ or $P_4$, by the counter 100 shown in FIG. 4. Counter 100 is activated by a signal from circuit 90 when $\Delta T_1$ equals $\Delta T_2$. A clock begins running which counts the pulses between $P_1$ and $P_2$ from sensor 30. An output voltage representing the total number of clock pulses is generated and outputted to controller 15, which contains the drive circuits for the print bars. The drive circuits energize a group of pixels in a non-image area of each print bar, the energized pixels providing a linear line output equal in length to the distance between the ROS beam cross-over points. FIG. 3 shows the energized pixels for 12A, e.g. pixels 12A5–12A11 and 12A25–12A31 being energized. These pixel outputs are then viewed by detectors 54, 56 through targets 30, 32, as belt 17 causes the targets to move beneath the print bar 12A. Detectors 54, 56 produce pulses $P_5$, $P_6$, as the pixel group output passes into view as targets 30, 32, pass overhead. If pulses $P_5$, $P_6$ are not in coincidence; e.g. $\Delta T_5$ does not equal 0, a signal is sent to control circuit 15 to provide a rotation to the print bar via a linear actuator such as a stepper motor. The print bar is incrementally rotated until $\Delta T_5 = 0$. The procedure is then repeated for image bars 14A, 16A, until all the print bars are registered with the ROS for skew.

While the invention has been described with reference to the structures disclosed, it is not confined to the details set forth, but is intended to cover such modifications or changes as they come within the scope of the following claims. For example, the printer may utilize a plurality of ROS units to form the sequential image frame. For this case, each ROS unit would be sequentially registered for skew in the manner disclosed for ROS unit 11.

What is claimed is:

1. An apparatus for registration of multiple image exposure frames on a photoreceptor belt, moving in a process direction, during a single rotation of the photoreceptor including:
   a photoreceptor belt adapted to accommodate the formation of an integral number of image exposure frames, said belt having first and second registration targets on opposite sides of the belt width in non-image areas, each target comprising a transparent V-shaped target with the apex of each V aligned along a common line parallel to the process direction,
   at least one Raster Output Scanner (ROS) unit associated with the formation of one of said image exposure frames, said ROS unit forming a plurality of projected scan lines in a fast scan (transverse) direction across the belt width, said scan lines beginning and ending at points outside of the image exposure frame and crossing over said registration targets, when said targets move therepast,
   a pair of detectors associated with each of said targets, said detectors detecting the light passing through said targets from said ROS as said belt carries said targets past said ROS,
   control means for comparing output signals generated by said detectors to establish whether coincidence exists between signals generated by each pair of associated detectors, and
   means for skewing the projected scan lines formed by said ROS until said detected signals are coincident.

2. The apparatus of claim 1 wherein each of said V-shaped targets has a pair of legs diverging from the apex and wherein said detectors generates pulses, $P_1$, $P_2$ and $P_3$, $P_4$ as the light from said ROS crosses over the legs of the first and second targets, respectively, pulses $P_1$, $P_2$ separated by a time interval $\Delta T_1$ and pulses $P_3$, $P_4$ separated by a time interval $\Delta T_2$ and wherein projected ROS scan lines are registered in the process direction when $\Delta T_1 = \Delta T_2$.

3. The apparatus of claim 2 further including at least one linear image print bar associated with the formation of one of said image frames, said print bar having a central portion of light emitting pixels which are selectively activated to form said image exposure frames and two pair of light emitting pixel segments outside of said exposure frame, said light emitting pixel segments separated by a distance d between segments equal to the distance between the ROS light crossovers on the legs of the two registration targets.

4. A method for aligning a plurality of Raster Output Scanner (ROS) which forms an image exposure area on a photoreceptor moving in a process direction, said method comprising the steps of:
   (a) providing a first aperture adjacent one edge of the belt outside the image exposure area and a second aperture adjacent the opposite belt edge and outside the image exposure area, said apertures comprising a transparent V-shaped target with the apex of each V aligned along a common line in the process direction, each target having a pair of legs diverging from said apex,
   (b) moving the photoreceptor belt until the beginning and end of the scan line from said ROS is transmitted through the legs of each of said targets and is sensed by first and second light sensors,
   (c) comparing the signals sensed by said first and second sensors, and
   (d) rotating the projected scan line to obtain coincidence of the output signals from the pair of sensors thereby enabling a skew adjustment.

* * * * *